United States Patent [19]
Kline et al.

[11] 3,891,773

[45] June 24, 1975

[54] CULTURE OF SOUR DOUGH BACTERIA

[75] Inventors: Leo Kline, Richmond; Takashi F. Sugihara, Pinole, both of Calif.

[73] Assignee: The United States of America as represented by the Secretary of Agriculture, Washington, D.C.

[22] Filed: Feb. 26, 1971

[21] Appl. No.: 119,381

[52] U.S. Cl. ..................... 426/61; 195/42; 195/48; 195/59; 195/96; 426/18; 426/19
[51] Int. Cl. ....... C12k 3/00; A21d 8/00; A21d 8/04
[58] Field of Search ................... 195/42, 48, 59, 96; 99/90 R, 90 S, 140 R; 426/18, 19, 61, 20

[56] References Cited
UNITED STATES PATENTS
3,404,984  10/1968  Olsen ................................. 99/90 R

OTHER PUBLICATIONS

Robinson et al., Cereal Chem., Vol. 35, pp. 295–305, 1958.

*Primary Examiner*—David M. Naff
*Attorney, Agent, or Firm*—M. Howard Silverstein; W. Takacs

[57] ABSTRACT

Procedures and media are disclosed for the culture of a new species of lactobacillus which is useful in the production of sour dough bakery products.

5 Claims, No Drawings

CULTURE OF SOUR DOUGH BACTERIA

A non-exclusive, irrevocable, royalty-free license in the invention herein described, throughout the world for all purposes of the U.S. Government, with the power to grant sublicenses for such purposes, is hereby granted to the Government of the United States of America.

This invention relates to and has among its objects the provision of procedures for culturing certain bacteria useful in the production of sour dough French bread. Further objects of the invention will be evident from the following description wherein parts and percentages are by weight unless otherwise specified.

Sour dough French bread is a special kind of bread preferred by many for its unique properties, including its crustiness and its appealing sour taste. In the United States, the true article is manufactured virtually only in San Francisco Bay Area. There, the product has been produced continuously for over 100 years and commands a market estimated to be 15 to 20 percent of all bread consumed. In addition, the product is exported to other areas of the United States and to foreign countries. Virtually everyone who has had occasion to visit San Francisco recalls with pleasure their encounter with sour dough French bread, and expresses regret that this product is not manufactured in their own locality. One of the objects of the invention is to provide the means whereby this unique product can be manufactured efficiently, economically, and in any location regardless of climate or topography.

In order to place the invention in proper focus, it is necessary to outline the method by which sour dough French bread is conventionally produced in San Francisco Bay Area establishments.

The heart of the process is the starter—or mother sponge, as it is common called. This sponge is not only the source of the leavening and souring powers, but it also provides the mechanism for perpetuating the process. In commercial practice the sponge is rebuilt on the average of about every 8 hours, or at least 2 to 3 times a day, 7 days a week. The procedure has been carried on in this fashion for at least 100 years, and the origin of the initial sponge is veiled in mystery.

The aforesaid sponge is made up from previous sponge, water, and a high gluten flour (e.g., one containing approximately 14 percent protein), these ingredients being typically used in the following proportions:

Sponge Formulation

50–100 parts previous sponge
100 parts flour (high gluten)
45–52 parts water

After mixing, the sponge is held (developed) for 7–8 hours at 75° to 80° F. Then it is ready for use in preparing a batch of dough. The pH of the sponge when made up is 4.4 to 4.5; final pH is 3.8 to 3.9.

In preparing a batch of dough, the aforesaid developed sponge is mixed with flour, water, and salt, typically in the following proportions:

Dough Formulation

15–20 parts sponge
100 parts flour (regular patent)
60 parts water
2 parts salt

After make-up the dough is allowed to relax for at least 30 minutes at 75°–80° F. Then it is scaled (divided into pieces of predetermined weight), rounded, and given an overhead proof of about 20 minutes at 90° F., after which it is molded, placed on canvas which is first dusted with rice flour and/or corn meal and allowed to proof about 6–8 hours at 85°–90° F. and at 70–90 percent relative humidity. The loaves are then baked in a hearth oven for 45–55 minutes at 375°–390° F. The atmosphere within the oven is kept very wet by saturating it with steam, particularly during the first half of the baking cycle. Also, just prior to baking, the tops of the loaves are slashed with a knife to prevent splitting and wrinkling of the crust during baking.

Another topic of significance in the production of San Francisco sour dough French bread lies in the microbiological aspects thereof. Although the product has been produced for at least 100 years, the microbial factors have not heretofore been discovered. It has always been known, of course, that some microbial action was involved and responsible for the leavening action and development of sourness; however, the nature of the organism or organisms has remained unknown. Our investigations have revealed that two distinct organisms are involved, and we have isolated each of these organisms.

One is a yeast which is responsible for leavening action. This yeast we have identified as the imperfect (non-sporulating) form of *Saccharomyces exiguus*, namely, *Torulopsis holmii*. One of the properties differentiating this yeast from ordinary baker's yeast (*S. cereviseae*) is that it cannot ferment or grow on maltose; it can ferment glucose, sucrose, raffinose, and galactose. *S. cereviseae*, on the other hand, can ferment all five of the named sugars. Another item is that *T. holmii* can can grow in media containing acetic acid. This is demonstrated as follows: Ten percent flour suspensions in water were adjusted to pH 4.5 with acetic acid and separate portions were inoculated with baker's yeast and *T. holmii*. After 6 hours incubation at 80° F., the count of viable baker's yeast cells decreased to less than 0.1 percent of the original number, whereas the *T. holmii* multiplied five-fold. It may be observed that although *T. holmii* is a known species of yeast, it was not previously known to be involved in sour dough French bread production.

The other microorganism involved in sour dough French bread we found to be a species of bacterium, closely related to or belonging in the genus Lactobacillus, and which species has not been heretofore known or described. This bacteria is responsible for the development of sourness in the product, and, as the discoverers, we have suggested the name *Lactobacillus sanfrancisco* therefor.

The present invention is concerned with this organism and provides the means for culturing it. Cultures thereof are useful in the liquid starter system for making sour dough French bread as disclosed in our copending application, Ser. No. 119,382, filed Feb. 26, 1971 and now U.S. Pat. No. 3,734,743, the disclosure of which is incorporated herein by reference.

The Sour Dough Bacteria

Samples of sour dough starter sponges were obtained from several bakeries in the San Francisco Bay Area, and from these we obtained in pure culture the previously unisolated and undescribed sour dough bacteria for which we, as the discoverers, have suggested the name *Lactobacillus sanfrancisco*.

Our efforts to isolate and grow this organism were greatly hampered and indeed initially unsuccessful because the organism has particular nutrient requirements and does not grow on any conventional media, including ones specifically advocated for the enumeration of lactic acid bacteria in flours and doughs. The nutrient requirements of the bacteria are discussed in detail hereinbelow.

In general, we found the bacteria to be present in fully developed sponges in numbers on the order of magnitude of about $1 \times 10^9$ per gram, which is about 30 to 100 times the number of sour dough yeast cells. Also, in exploring the sponges from the different sources, we obtained five different isolates of *L. sanfrancisco* which are herein designated as B, C, L, P, and T. In general, these strains differ only slightly from one another and any of them can be employed in a practice of this invention and that described in our copending application identified above. Strains P and L are particularly similar and may be considered as identical.

Cultures of several strains of *Lactobacillus sanfrancisco* useful for the purpose of the invention have been deposited in the Stock Culture Collection of the U.S. Department of Agriculture, Northern Regional Research Laboratory, Peoria, Ill. 61604, from which organization samples of these strains may be obtained.

Moreover, since we have characterized the organism and elucidated its nutrient requirements and other conditions for growth, we have provided the tools whereby those skilled in microbiology can themselves isolate the organism from sources thereof such as sour dough sponges and doughs.

There follows next a description of, and methods for culturing the bacterial species which is the subject of this invention. References to SDB both designate the medium routinely used by us for culturing the organism. Its composition is given below:

Sour Dough Bacteria (SDB) Broth*

|  | Per cent |
|---|---|
| Maltose | 2 |
| Commercial yeast extract | 0.3 |
| Fresh yeast extractives (FYE)** | 0.5 to 1.5 |
| Sorbitan polyoxyethylene monooleate (Tween 80) | 0.03 |
| Casein hydrolysate (Trypticase) | 0.6 |
| Water | to make 100 |
| Adjust to pH 5.6 with 20% lactic acid or with 1 N to 6 N HCl. | |

*The broth with the stated ingredients is used in carrying out liquid cultures. To conduct the cultures on a solid medium—e.g., plates or slants—a small proportion of agar (2%) is added to the broth. Such medium is referred to below as SDB agar. Routinely, cultures on SDB broth or SDB agar were incubated at 30–31°C. for 1 to 2 days in an atmosphere containing $CO_2$, attained by flushing the headspace above the broth cultures with $CO_2$, or, in the case of the agar cultures, placing the plates or slants in a receptacle wherein air was evacuated and replaced by a $CO_2$-air mixture containing about 25–95 volume per cent of $CO_2$.
**Prepared by autoclaving a 20% suspension of commercial compressed baker's yeast in distilled water for 30 minutes at 15 psi, allowing the suspension to settle overnight at 34–35°F., decanting and further clarifying the supernatant by centrifugation. The extract prepared in this manner contained 1.5% solids and, if not to be used within a few days, was frozen or freeze-dried immediately. The FYE preparations are used in a proportion to furnish 0.5 to 1.5% of the dry FYE solids.

General properties

*L. sanfrancisco*, in the stage of early growth, either in the sponge or in pure culture, and before the total acidity is developed, appears as short-to-medium slender rods or very short chains with only a minor tendency to form bent or filamentous forms. However, under poor nutritional conditions, or in older cultures, it commonly assumes involuted or filamentous forms sometimes of immense length, and, occasionally, swollen or bulged pleomorphic forms. On plate agars, when vigorous, it grows out as smooth, round, translucent colonies of about 1 mm. or less diameter.

It is gram-positive in the early stages of growth, nonmotile, and catalase-negative as indicated by lack of gas formation when a 10 percent solution of $H_2O_2$ is poured on the colonies on a spread agar plate.

In sponges and doughs, approximately 70–80 percent of the total organic acidity produced by the organism is lactic, the remainder acetic acid. In pure broth cultures, the lactic/acetic acid ratio is variable, depending on the atmosphere to which the culture is exposed. Because of the production of acetic acid, we judge the bacteria to be a heterofermentative type of lactobacillus. It may be noted that the formation of acetic acid is a key not only to the unique flavor of sour dough French bread, but also to protecting the sour dough starter system against contamination, since acetic acid is lethal to many microorganisms.

Gas ($CO_2$) is produced by all strains in pure culture. Growth is inhibited by sorbic acid, but not by actidione—an antibiotic produced by *Streptomyces griseus*. The organism is mesophilic and does not exhibit any unusual heat or salt tolerance.

Heat Resistance and Salt Tolerance

Twelve- and 24-hour SDB broth cultures of three different strains (B, L, and T) were subjected to submersion in a bath at 60° C. for 15 minutes in a manner which included a 3- to 4-minute come-up time. The 12-hour cultures had counts varying from 19 to $34 \times 10^7$ cells per ml. and the 24-hour cultures, 150 to $160 \times 10^7$ per ml. No viable survivors were found in any instance at the greatest dilution tested ($<1 \times 10^6$), suggesting these bacteria do not posses any unusual thermal tolerance.

Four strains (B, L, T, and C) were tested for growth in SDB broth containing 4 or 6.5% NaCl. No development of turbidity was evident even after 4 to 6 days incubation, suggesting no unusual salt tolerance. Salt does stimulate growth in aqueous flour suspensions but at a concentration of about 0.5 percent.

Requirement for Maltose

A particularly distinguishing characteristic of *L. sanfrancisco* is that it requires maltose for rapid and heavy growth. Other sugars including xylose, arabinose, galactose, lactose, sucrose, raffinose, and rhamnose are not utilized. Some isolates of the bacteria can adapt to glucose, but only after a long lag period.

The preference of the organism for maltose is demonstrated by the following example.

EXAMPLE 1

Samples of SDB agar prepared as described above, and others modified by substituting the maltose by the same proportion (2 percent) of other sugars, were plated with different strains of the bacteria, held at 31° C. for 2 days, and examined for growth. The results are tabulated below:

Table I

| Strain | Growth on carbohydrates tested* | | | | | | | |
|---|---|---|---|---|---|---|---|---|
| | Xylose | Arabinose | Glucose | Galactose | Sucrose | Maltose | Rhamnose | Raffinose |
| B | − | − | − | − | − | + | − | − |
| P | NT | − | − | − | − | + | NT | NT |
| L | − | − | − | − | − | + | NT | NT |
| T | − | NT | − | − | NT | + | − | − |

*Growth designated +
No growth designated −
Not tested designated NT

EXAMPLE 2

To examine the effect of different levels of maltose on growth and acid production, two strains of the bacteria were grown at 31° C. on SDB broth wherein the amount of maltose was varied. Growth was estimated by cell volume and turbidity, acid production by measurement of pH. The results are tabulated below:

Table II

Effect of Maltose Level on Growth and pH Drop in Broth Cultures
(1.5% FYE in SDB broth)

| Maltose level, % | Strain L - 24-hr. | | | Strain C - 41-hr. | | |
|---|---|---|---|---|---|---|
| | pH | Cell volume (ml/10 ml culture) | Turbidity* | pH | Cell volume (ml/10 ml culture) | Turbidity* |
| 0.10 | 4.50 | .02 | .08 | 5.07 | .01 | .09 |
| 0.25 | 4.45 | .03 | .23 | 4.80 | .02 | .15 |
| 0.50 | 4.40 | .07 | .47 | 4.48 | .04 | .30 |
| 1.00 | 4.15 | .11 | .63 | 4.17 | .06 | .35 |
| 1.50 | 4.15 | .11 | .60 | 4.10 | .08 | .39 |
| 2.00 | 4.15 | .10 | .62 | 4.10 | .07 | .39 |

*Optical density measured at 525 mμ in Bausch and Lomb Spectronic 20 after first diluting culture with distilled water 1:5. Turbidity figures corrected for turbidity in uninoculated SDB broth as a function of pH.

Taking into account the foregoing data, in a practice of the invention we use a culture medium containing maltose. Generally, this sugar is supplied in a concentration of at least 0.5 percent and preferably about 2 percent. The maltose can be supplied as such or by any of the carbohydrate materials containing it, for example, corn syrup or corn syrup solids, malt extract, and other maltose-containing substances prepared by enzymic or chemical hydrolysis of starches from rice, wheat, potato, barley, oats, etc.

Fresh Yeast Extractives

Another characteristic of L. sanfrancisco is that certain yeast extractives are required to obtain good growth and that they provide a response which cannot be attained by commercial yeast extracts and autolysates, by casein hydrolysates, or by vitamin $B_{12}$. The substances used in accordance with the invention are generally designated as fresh yeast extractives (FYE) to distinguish them from the conventional product, and may be prepared in various ways as explained below.

Baker's yeast is suspended in water and the suspension autoclaved—heated under a steam pressure of about 10–25 psi. The suspension is then cooled and the supernatant is separated by decanting, centrifugation, or filtration. The so-produced FYE is used immediately or within a few days. If it is to be held for a long period, it is frozen or freeze-dried. The FYE preparations are used in culture media in a proportion to furnish at least 0.5 percent, preferably about 1.5 percent, of the dry FYE solids.

An alternative method for preparing FYE is to autolyze baker's yeast by holding a 1:1 suspension of yeast in distilled water under toluene (to exclude air) for 3 days at 50°–55° C., then heating the material to boiling, and clarifying it by centrifugation or filtration to segregate the clear liquid.

Without the use of FYE we have found that the growth of L. sanfrancisco is very slow, e.g., requiring 4 to 6 days to achieve even slight growth.

As noted previously, such materials as commercial yeast extracts and casein hydrolysates, cannot substitute for FYE. However, either or both of these may be used in the culture in conjunction with FYE to attain an added stimulatory effect on growth. Of the two, casein hydrolysates exert a more substantial stimulation.

Taking into account the previous considerations, culture media in accordance with the invention contain FYE as a critical component, and preferably also contain conventional yeast extract in a proportion of about 0.3 percent and casein hydrolysate in a proportion of about 0.2 to 1 percent. The use of casein hydrolysate is particularly desirable. The culture media may also contain other conventional stimulants such as biotin, vitamins of the B category, soybean hydrolysate, corn steep liquor, distiller's solubles, or other sources of organic nitrogenous nutriment.

EXAMPLE 3

To examine the effect of different levels of FYE on growth, two strains of the bacteria were grown at 31° C. on SDB broth wherein the amount of FYE was varied. The degree of growth was estimated by measuring cell volume of the cultures. The results are tabulated below:

Table III

Effect of Level of FYE on Growth in Broth Cultures

| FYE % | Cell volumes (ml/10 ml culture) | |
|---|---|---|
| | B strain 24-hr. | L strain 24-hr. |
| 0.25 | .03 | .04 |
| 0.50 | .04 | .08 |
| 1.00 | .07 | .12 |
| 1.25 | .10 | .13 |
| 1.50 | .13 | .18 |

Unsaturated Fatty Acids

Our investigations have shown that unsaturated fatty acid is a required nutrient for the growth of *L. sanfrancisco*. This requirement may be satisfied by adding to the culture medium a derivative of an unsaturated fatty acid (e.g., oleic, linoleic, linolenic, ricinoleic, etc.) which is soluble in water, or at least emulsifiable therewith. Thus, one can use sodium or potassium salts of unsaturated fatty acids or substances which contain them, e.g., sodium or potassium soaps derived from olive oil, cottonseed oil, linseed oil, soybean oil, safflower oil, corn oil, or other fat or oil which contains unsaturated glycerides. Other derivatives which may be used are partial esters of unsaturated fatty acids and sugars or polyhydric alcohols, e.g., sucrose monooleate, sucrose dioleate, glycerol monooleate, ethylene glycol monooleate, pentaerythritol monolinoleate, mannitol monooleate, and the like. Particularly preferred among the esters of polyhydric alcohols are unsaturated fatty acid esters of sorbitan such as sorbitan monooleate; condensation products of ethylene oxide with sorbitan fatty acid esters such as sorbitan polyoxyethylene monooleate; and condensation products of ethylene oxide with unsaturated fatty acids such as polyoxyethylene monooleate. Other derivatives which may be used are lecithins which contain moieties of unsaturated fatty acids such as oleic. In general, only a small proportion of the unsaturated fatty acid derivative is needed, e.g., about 0.01 to about 0.1 percent.

EXAMPLE 4

To examine the effect of different levels of sorbitan polyoxyethylene oleate (SPO) on growth, the B strain of the bacteria was grown on SDB agar wherein the amount of SPO was varied. The results are as follows:

Table IV

| Conc. of SPO % | Colony size after 2 days at 31°C. |
|---|---|
| 0 | None |
| 0.0075 | Very small (not countable) |
| 0.02 | Medium |
| 0.035 | Large |
| 0.05 | Large |

Gaseous Atmosphere

The bacteria is indifferent to oxygen. Accordingly, it can be cultured under anaerobic or aerobic conditions. The presence of carbon dioxide is generally beneficial and may even stimulate growth. Accordingly, in a preferred modification of the invention, the culture is carried out in an atmosphere containing this gas. This may be done by wholly or partly flushing air out of the headspace of the culture vessel with $CO_2$. Rigid exclusion of air is not necessary and the atmosphere above the culture broth may contain, for example, about 25 to 95 volume percent of $CO_2$ (the remainder being air). Alternatively, one may sparge the culture with $CO_2$ or with $CO_2$-air mixtures containing 25–95 volume percent of $CO_2$.

Temperature

As noted above, the bacteria are mesophilic; they grow best on a moderate temperature of about 25°–35° C. although they do grow over the range from about 15° to about 40° C. No growth was observed at 45° C.

EXAMPLE 5

To examine the effect of temperature, the L strain was grown at various temperatures on SDB agar or broth. The results are summarized below:

Table V

Effect of Temperature on Growth*

| Temperature, °C. | Growth on SDB agar** | | |
|---|---|---|---|
| | Days | | |
| | 1 | 2 | 3 |
| 13 | — | ± | +1 |
| 24 | +2 | +3 | +4 |
| 31 | +3 | +4 | +4 |
| 37 | — | +1 | +2 |

*Data shown are for L strain. Similar results are obtained with B and T strains with possible exception of slightly slower growth at 13° C.
**Explanation of symbols:
— = no growth
± = very faint growth
+1 = very slight growth
+2 = slight growth
+3 = moderate growth
+4 = heavy growth Table VI Effect of Temperature on Growth*
Growth in SDB broth (0.5% FYE)

| Temperature | Cell volume (ml/10 ml. culture) Days | | | | pH Days | | | |
|---|---|---|---|---|---|---|---|---|
| | 1 | 2 | 3 | 6 | 1 | 2 | 3 | 6 |
| 13° C. | 0 | .03 | .04 | .07 | 5.2 | 4.5 | 4.2 | 3.9 |
| 31° C. | .09 | .14 | .15 | .14 | 4.2 | 3.9 | 3.8 | 3.7 |
| 45° C. | 0 | 0 | 0 | 0 | 5.1 | 5.2 | 5.2 | 5.3 |

*Data shown are for L strain. Similar results obtained with B and T strains with possible exception of slightly slower growth at 13° C.

Effect of pH

Another particularly distinguishing characteristic of *L. sanfrancisco* is that it grows best in a distinctly acidic environment, i.e., one having a pH below 6. In this regard the organism is in sharp contrast to known species of lactobacilli.

Since the organism produces acid, the medium will become acid even if it was not so originally. However, a better rate of growth is attained where the medium is acidified when the culture is started. Accordingly, in the preferred embodiment of the invention, when the medium is made up, it is acidified to a pH of about 5 to 6. For this purpose, one may use lactic, acetic, hydrochloric, or other non-toxic acid. Generally, hydrochloric and acetic acids are preferred.

EXAMPLE 6

To test the effect of different starting pH's, samples of SDB broth (0.5% FYE) were adjusted to various pH's with HCl and various strains of the bacteria grown thereon at 31° C. The results are given below:

Table VII

| | Effect of Initial pH on Growth* | | | | | | | |
|---|---|---|---|---|---|---|---|---|
| | T strain | | | | L strain | | | |
| Initial pH | Cell volumes (ml/10 ml culture) | | pH | | Cell volumes (ml/10 ml culture) | | pH | |
| | 24-hr. | 48-hr. | 24-hr. | 48-hr. | 24-hr. | 44-hr. | 24-hr. | 44-hr. |
| 6.5 (unadj.) | .01 | .04 | 5.6 | 4.2 | .00 | .10 | 5.9 | 4.1 |
| 6.0 | .02 | .05 | 4.3 | 3.8 | .07 | .12 | 4.3 | 3.8 |
| 5.5 | .03 | .08 | 4.1 | 3.8 | .15 | .13 | 4.2 | 3.8 |
| 5.0 | .07 | .19 | 4.1 | 3.7 | .19 | .17 | 4.1 | 3.7 |

*Initial pH adjustment of SDB broth (0.5% FYE) with HCl. Similar results obtained with B and C strains.

Acid Production

As noted above, the bacteria produce both lactic and acetic acids, the former in greater proportion. This property of *L. sanfrancisco* is demonstrated in the following example.

EXAMPLE 7

Strain B was grown on SDB broth (1.5% FYE) at 31° C. for 2 days, and analysis was conducted to determine the amount and kind of acid produced. The results are given below:

Table VIII

| Lactic and Acetic Acid Production* in SDB Broth | |
|---|---|
| Total acidity, μmole/ml. | 67.8 |
| Lactic, % of total acid | 75 |
| Acetic, % of total acid | 25 |

*Corrected for lactic and acetic acids in uninoculated medium.

Taking into account the various factors elucidated above, illustrative formulations of culture media in accordance with the invention are given below:

| Ingredient | Amount |
|---|---|
| Maltose (or other carbohydrate containing maltose) | At least 0.5%, preferably about 2% (of maltose) |
| Unsaturated fatty acid derivative | About 0.01 to 0.1%, preferably about 0.03% |
| Fresh yeast extractives | At least 0.5%, preferably about 1.5% |
| Casein hydrolysate (optional) | About 0.2 to 1% |
| Conventional yeast extract (optional) | 0 to 1% |
| Water | To make 100% | pH adjusted to a level of 5 to 6.

Prior to use, the medium is sterilized by autoclaving, e.g., at 15 psi for 15 minutes.

Harvesting

In various applications of the invention one can use the cultures of *L. sanfrancisco* directly. For example, in starting new cultures a portion of a previous culture can be used as an inoculum. In most cases, however, it is preferred to harvest the bacterial cells from the culture and use them in such isolated form. This technique is preferred, for example, in preparing liquid starters for production of sour dough French bread in accordance with the teachings in our copending application referred to above.

The harvesting is typically done by centrifuging the broth culture to segregate the cells. The resulting cell concentrate is then preferably washed to remove nutrients and metabolic products. For this washing, we usually use a dilute aqueous solution of NaCl.

In the event that the cell concentrate is not to be used soon after preparation, it may be preserved by freezing it. For best results, the cell concentrate is incorporated with a stabilizing carrier prior to freezing. As the carrier, one may use such substances as glycerol, dimethyl sulfoxide, skim milk, milk proteins, milk protein hydrolysates, sucrose, corn syrup, etc. Part of the total carrier is preferably fresh medium, that is, SDB broth or other liquid nutrient medium as disclosed herein which is useful for culture of *L. sanfrancisco*. In typical cases, 100 parts of the cell concentrate are incorporated with 100 to 200 parts of a stabilizing menstruum which contains about 3 to 30 percent glycerol, the remainder liquid nutrient medium, for example, SDB broth. To prevent contamination of the cell concentrate, the added carrier material should be sterilized prior to use. The cell concentrate plus added carrier is preferably flash-frozen, for example, by using a super-cold refrigerant such as liquid nitrogen, and held at a temperature below 0° C., whereby it retains its viability for considerable periods of time.

Typical procedures for harvesting and preserving the bacterial preparations are demonstrated in the following illustrative example.

EXAMPLE 8

*L. sanfrancisco* is grown on a nutrient broth as previously described, and the cells are harvested by centrifuging the broth, preferably using a refrigerated centrifuge. The centrifuge cake is then washed with chilled 1 percent aqueous salt solution to remove nutrients, metabolic products, etc. The washed cells can then be used as the bacterial inoculum for liquid starter make-up.

If the cells are not needed a short time after preparation, they may be preserved as follows:

The washed cells (100 parts) are suspended in 200 parts of a stabilizing carrier (a mixture of 60 parts of glycerol and 140 parts of sterile SDB broth) and the suspension is flashfrozen, using liquid $N_2$ or Dry ice-acetone slush. The culture is then held in a frozen state (about −20° F. or below) whereby it retains its viability for at least 2 months. When the product is to be used, it is thawed rapidly to 70°–80° F. and used immediately.

Use of the Bacterial Preparations

The products of the invention—the cultures, isolated bacterial cells or cell concentrates, etc., can be used for various applications such as converting maltose into lactic and acetic acids. A preferred use is for preparing liquid starters for production of sour dough French bread, as disclosed in our copending application referred to above. The following examples illustrate such use of our product.

EXAMPLE 9

Preparation of Liquid Starter

In a tank equipped with an agitator, a slurry is made of the following ingredients:
100 parts flour
250 parts water
2 parts salt The slurry is adjusted to a pH of about 5.5 with acetic or hydrochloric acid. It is then inoculated with cell concentrates of sour dough yeast, *Torulopsis holmii*, and of sour dough bacteria, *Lactobacillus sanfrancisco*, in amounts to provide about $2 \times 10^6$ yeast cells/g. and about $1 \times 10^8$ bacterial cells/g.

The slurry is then developed by holding it about 80° F. for 6–8 hours, applying just enough agitation to keep the flour in suspension. During this period the yeast and bacteria multiply at a rapid rate, yielding a liquid starter which can be used for formulation of a dough for preparing sour dough French bread.

EXAMPLE 10

Preparation of Sour Dough French Bread 200 parts flour (high gluten)
500 parts water
4.4 parts salt The foregoing ingredients were mixed together and the resulting slurry adjusted to pH 5.2 by addition of hydrochloric acid. The slurry was inoculated with 1 part of a cell concentrate of *Torulopsis holmii* and 5 parts of a cell concentrate of *Lactobacillus sanfrancisco*, then developed 8 hours at 75°–80°F. The resulting liquid starter was then used to prepare bread as explained below.

A dough was prepared from the developed liquid starter, using the following formulation:
592 parts flour (standard bread)
226 parts liquid starter
238 parts water
10.8 parts salt
23.1 parts 0.1 percent aq. sol. of $KBrO_3$
9.9 parts 0.1 percent aq. sol. of $KIO_3$ The dough was mixed for about 5 minutes in a conventional dough mixer, then allowed to relax for 30 minutes. The dough was next scaled (divided into pieces by weight), and given an overhead proof for 20 minutes at 90°F. The loaves were then molded, placed on canvas and proofed about 6.5 hours at 85°–90°F. Finally, the loaves were slashed and baked in a steam-saturated oven. Except for the different dough formulation, all the operations from dough mixing through baking were carried out as conventional in the preparation of sour dough French bread by the usual sponge method.

The bread so produced had an excellent flavor, texture, and volume. In particular, the volume was 1,685 ml. (for a 15-oz. loaf).

EXAMPLE 11

Isolation of *L. sanfrancisco*

This example demonstrates how one may isolate *Lactobacillus sanfrancisco* from a source material such as a sour dough starter sponge or a bread dough prepared therefrom.

A small amount of the source material, say 1 gram, is intimately mixed with sterile water or sterile aqueous peptone (0.1 percent). A portion of the resulting suspension is removed and mixed with an additional quantity of sterile water or peptone solution. This process of dilution is repeated a number of times until the source material is diluted approximately $1:10^8$.

One-tenth to 1 ml. of the diluted liquid is then used to inoculate a plate of SDB agar (as hereinabove described), and the plate incubated at 31°C. for 1-2 days. The desired bacteria will appear as numerous translucent, spherical, colorless colonies having a diameter of about 1 mm. or less. In the event that any sour dough yeast (a component of the original source material) grows out on the plate, it can be readily distinguished from the bacteria in the following ways: The sour dough yeast colonies will be present in small number—about 1/50 to 1/100 the number of bacterial colonies; they will be of much larger diameter (about 5 mm. or more); and will have an opaque appearance in contrast to the translucent appearance of the bacterial colonies.

Using a sterile needle, a bacterial colony is picked off the plate, transferred to a slant of SDB agar, incubated at 31°C. for 1–2 days, then cooled to 45°–50°F. and held at this temperature. This product is the desired pure culture of *L. sanfrancisco*.

By transferring a portion of the culture every 4–6 weeks to fresh SDB agar slants, reincubating, and holding at 45°–50°F., the organism can be maintained indefinitely in viable condition.

Having thus described the invention, we claim:

1. The process for preparing a product useful in the production of sour dough bakery products which comprises:

a. providing a liquid nutrient medium containing water, maltose, an unsaturated fatty acid derivative, and fresh yeast extractives, and having a pH of 6 or below, b. inoculating the nutrient medium with viable cells of the sour dough bacteria, *Lactobacillus sanfrancisco*, and c. holding the inoculated nutrient medium at a temperature of about 25°–35°C. until a substantial growth of the bacteria has taken place.

2. A process for isolating the bacterial species, *Lactobacillus sanfrancisco*, from a source material which comprises:
  a. providing a nutrient medium containing water, maltose, an unsaturated fatty acid derivative, agar, and fresh yeast extractives, and having a pH of 6 or below,
  b. inoculating the nutrient medium with a source material selected from the group consisting of sour dough sponges and doughs prepared therefrom,
  c. incubating the inoculated medium at a temperature of about 25°–35° C. for 1–2 days,
  d. removing from the incubated medium a colony of *L. sanfrancisco* characterized by having a diameter of 1 mm. or less and being translucent, spherical, and colorless, and
  e. transferring said colony to a fresh batch of said nutrient medium.

3. The process which comprises growing the sour dough bacterial species, *Lactobacillus sanfrancisco*, on a liquid medium containing water, maltose, an unsaturated fatty acid derivative, and fresh yeast extractives, at a pH of 6 or below, and a temperature of about from 15° to 40° C.

4. A composition of matter comprising an admixture of
  a. viable cells of *Lactobacillus sanfrancisco*, and
  b. a liquid nutrient medium containing water, maltose, an unsaturated fatty acid derivative, and fresh yeast extractives, said composition being free from sour dough yeast.

5. A composition of matter comprising an admixture of:
  a. viable cells of *Lactobacillus sanfrancisco*,
  b. a stabilizing carrier selected from the group consisting of glycerol, dimethyl sulphoxide, skim milk, milk proteins, milk protein hydrolysates, sucrose, and corn syrup, and
  c. a liquid nutrient medium containing water, maltose, an unsaturated fatty acid derivative, and fresh yeast extractives.

* * * * *